Patented June 17, 1924.

1,498,387

UNITED STATES PATENT OFFICE.

LESTER KIRSCHBRAUN, OF CHICAGO, ILLINOIS.

EMULSION AND PROCESS OF MAKING SAME.

No Drawing. Application filed August 16, 1922. Serial No. 582,312.

*To all whom it may concern:*

Be it known that I, LESTER KIRSCHBRAUN, a citizen of the United States, residing in the city of Chicago, county of Cook, and State of Illinois, have invented certain new and useful Improvements in Emulsions and Processes of Making Same, of which the following is a specification.

This invention relates to improvements in emulsions and process of making same and refers more particularly to what may be termed a "rubber" emulsion.

In carrying out this invention, I may make the emulsion by mixing 20% bentonite or proper colloidal clay, with 80% of rubber, which rubber may, if desired, be Pará rubber or other well known grades of crude or reclaimed rubber or a mixture of both, and also with 60 parts of water. Preferably the water and bentonite will be first mixed and then the rubber added. The rubber can be added in such form as may be desired. The contents of the receptacle in which this is placed may be heated to 300 to 400 degs. F., and the receptacle provided with suitable agitating paddles to thoroughly mix the contents thereof. Also a pressure of from 50 to 200 pounds may be maintained on the contents of the receptacle. This pressure may be obtained from the steam generated or by the introduction of extraneous gas, which may or may not act upon the rubber, as for example, a hydrocarbon gas. The emulsion so made may be diluted with further addition of water, cooled and drawn off. It then may be mixed with fibrous stock if desired and suitably formed, moulded or sheeted. It might be sheeted on a paper machine. The emulsion so formed is miscible in water.

An invention may be carried out in the manner described, to which is added, either with the extraneous gas or otherwise, some suitable reagent, as for example, sulphur. In ordinary operation, this might not be necessary but there might be cases in which this might be desirable.

I claim as my invention:

1. An emulsion consisting of rubber, bentonite as an emulsifying agent, and a fluid vehicle.

2. An emulsion consisting of rubber, an emulsifying agent, and a fluid vehicle.

3. An emulsion consisting of rubber, an emulsifying agent of an earthy character and water.

4. An emulsion, miscible in water, containing rubber, an emulsifying agent of an earthy character and water.

5. The process of making an emulsion miscible in water, consisting in mixing bentonite, water and rubber, agitating the same while subjected to the action of heat and pressure.

6. The process of making an emulsion miscible in water, consisting in mixing an emulsifying agent, water and rubber, agitating the same while subjected to the action of heat and pressure.

LESTER KIRSCHBRAUN.